Figure 2:
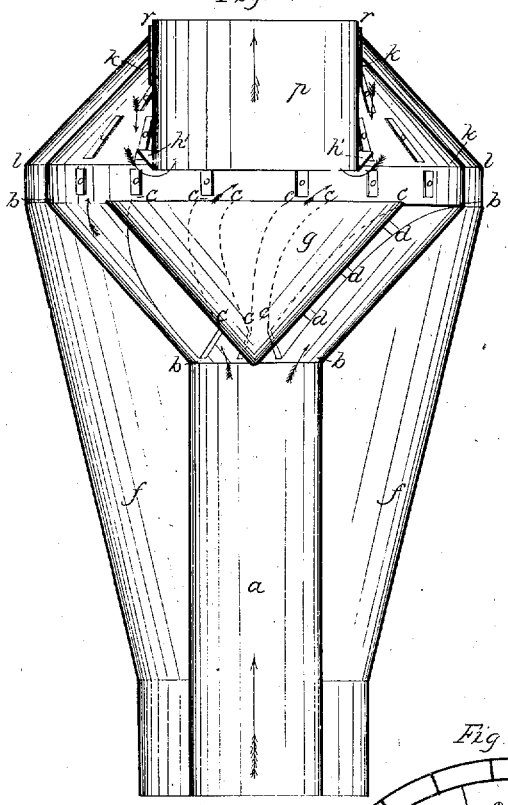

Radley & Hunter,

Spark Arrester.

No. 293. Reissued Jan. 16, 1855.

UNITED STATES PATENT OFFICE.

JAMES RADLEY AND JOHN W. HUNTER, OF NEW YORK, N. Y.

IMPROVEMENT IN SPARK-ARRESTERS.

Specification forming part of Letters Patent No. 7,040, dated January 22, 1850; Reissue No. 293, dated January 16, 1855.

*To all whom it may concern:*

Be it known that we, JAMES RADLEY and JOHN W. HUNTER, of the city, county, and State of New York, have invented a new and useful Improvement in Spark-Arresters; and we do hereby declare the following to be a full, clear, and exact description of the same, reference being had to the annexed drawings, making a part of this specification, in which—

Figure I is a perspective view of the interior. Fig. II is a vertical section. Fig. III is a transverse section, and like letters refer to like parts in all the figures.

Our invention consists in an improved construction of chimneys or smoke-pipes; and the design of our improvement is to prevent the discharge of anything from the pipes, flues, &c., save only smoke and gases, thereby retaining all other matters which may be disengaged from the fire—as, for instance, live coals, sparks, cinders, ashes, and dirt—as according to the nature of the fuel consumed, and the intensity of the draft, all these substances are more or less freely thrown off and discharged into the air. Under many circumstances the fire, dirt, &c., discharged from pipes and flues in this way amounts to a quantity exceedingly dangerous to property and structures in the vicinity, and therefore many attempts have been made to obviate the evil.

The greatest annoyances from the above causes, however, are felt in railway and steamboat travel, and our invention has in view for its principle field of operation these two subjects.

As many attempts have already been made to remedy the evils arising from the escape of sparks, &c., from locomotives and steamboat furnaces, we deem it proper, in order that the distinctive features of our invention may be more clearly seen, to mention briefly the general principle of such structures. The first kind has consisted usually of some arrangement of screens or caps made of wire-gauze or plates of iron perforated with numerous holes. Against these screens the products of combustion are made to impinge before escaping into the air. The meshes of the screen thus act as a bar to the passage of grosser particles of dirt, casting them back into the furnace or other receptacles variously contrived, while the clear gases are allowed to escape into the air. All structures based upon such screens, however arranged and contrived, have failed to operate so as wholly to arrest the objectionable matter flowing from the fire, or even to a degree at all satisfactory, as the intensity of the draft is usually such as to force a large amount through with the smoke, &c. Another mode has been to force the blast through reservoirs of water, and thus destroy the living sparks, and catch the dirt, &c. This plan has also failed from many causes, among which may be mentioned the difficulties of maintaining the requisite draft both in this latter and this former method.

Our invention differs from all these plans, and especially in that there is nothing whatever in the way of the discharge of the gases and smoke by free and unobstructed passages, while we at the same time separate therefrom and retain all sparks and other substances mixed therewith in the interim between leaving the fire and final discharge place of the flue or pipe. Thus no screen-work either of wire-gauze or similar material is at all used by us.

Figure 1:
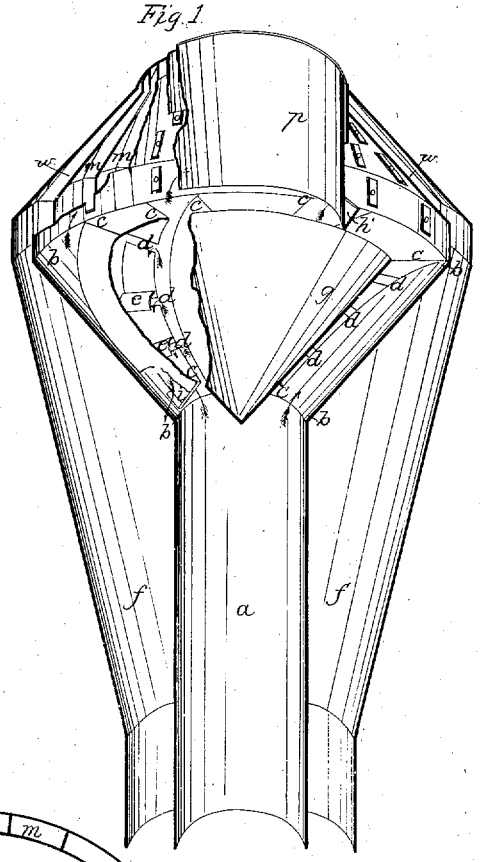

In Figs. 1 and 2 are sections of our pipe, showing their interior arrangement for conveying off the smoke and gases, and the method of separating the sparks, dirt, &c., in their passage toward the discharge.

Our invention is composed of two parts, generally. The first part consists of an outer casing or shell, which forms also a receptacle for the arrested matter, and an interior arrangement of parts combined with said shell, which consists of the stack or principal flue and its attachments.

Figure 3:
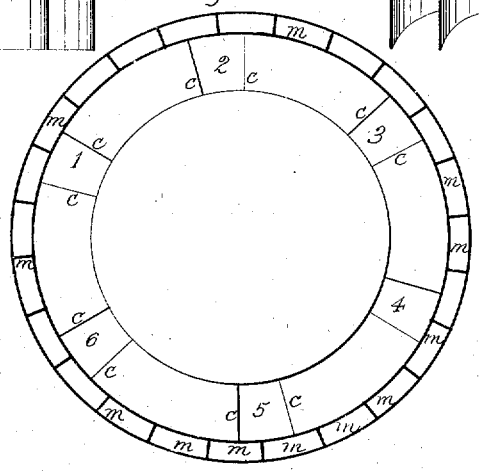

At the letter *a* is represented the stack or principal flue. In this all the products of combustion—viz., gases, smoke, sparks, cinders, &c.—are received and ascend in the direction indicated. At the top of this flue an appendage is affixed, which is to cause a divergence of the ascending mass of smoke, sparks, &c., into several currents, and is the place where our invention begins to operate by commencing here to separate such substances as are to be retained within the pipe—viz., sparks, ashes, &c. To do this we attach to the top a conical or funnel-shaped piece, as seen at *b b*. Around the inside surface of this funnel we next arrange a series of compartments, consisting of three plates arranged triangularly, and as shown at *c c c*. A number of these having been determined upon—as say, six—are made and attached to *b* in positions equidistant from each other, thus leaving like numbers of channels or spaces between, as seen in Fig. 3, (marked 1, 2, 3, &c.). Into one of the sides of *c* a number of openings are made, as seen at *d*, and over all these openings, except the topmost one, an angular-shaped cap, *e*, is put, as shown.

Around the base of the funnel *b* openings are made in such positions as will form communications from the chambers *c* to the space made by the outside shell, *f*, and the interior stack, *a b c*, &c., one of which openings is seen at *i*. That side of the chamber *c* in which the openings *d* are made is curved in such a manner that the spaces or channels 1, 2, 3, &c., between are spiral, and thus the currents of smoke, gas, &c., as they pass through are made to impinge against that side containing the openings *d*, as the sparks and dirt are more ponderable than the gases with which they are intermixed, and are consequently dashed against the side of *c*, and sliding over the surface of which as they come opposite the openings *d* are urged within the chamber both by their own momentum and by the pressure of the current. The use of the angular caps *e* now becomes apparent, which is to check the upward motion which the sparks and dirt would still have and turn them downward, as but for this, those entering in at the lower holes would pass on and out again at the top ones. The sparks and dirt thus caught are discharged by the hole *i* into the space *f*. Finally, to complete this part, an interior cap, consisting of a funnel or cone, *g*, of lesser dimensions than *b*, is fitted. Thus this part may be said to consist of two funnels of different diameters placed within each other, and the space between divided in compartments, as described at *c c*, &c., and 1 2 3, &c.

Having described the construction and operation of our invention to the end of the first part, so far as the separation and arresting of the grosser parts of the dirt and sparks, we now proceed to describe another feature in the construction, whereby all the remaining finer particles of dirt and sparks to be retained are caught; for, in consequence of the great velocity of the current through the channels 1 2 3, &c., it is not probable that all the sparks are taken out of the smoke. To insure this, we next put upon the top of *f* and *b* an inclined cap or covering, as seen at *k k l l*, the outer one, *l*, being attached to the shell *f*, and the inner one, *k*, to the funnel *b*. The top of the cover forms a large circular opening, and is the final discharge-place for the smoke, &c. The inner and outer covers are so placed as to leave a space between them, which space is divided by a series of partitions (seen at *m m*) extending from the top down to the base, or where the cover joins *b f*. The inner cover is next pierced with a series of oblong openings, *o*, so as to communicate with each of the sections formed by the partitions *m*. The next feature is the introduction of a peculiar piece for regulating the intensity of the draft. This consists of a short pipe, *p*, suspended in the aperture at the top formed by the conical cap *l*. This is so arranged as to be raised or lowered at pleasure; or, where the draft is required to be constant, after finding the proper place it may be permanently fixed. The lower edge of this pipe drops down into the interior, so as to be suspended a short distance above the top of the funnels *g b*. The intensity of the draft is regulated by raising or lowering this pipe, being increased by raising and decreased by the contrary action, as the space between the lower edge of the pipe and the top of the funnels is enlarged or diminished; also, the angle required in the currents to escape is increased and diminished by the same operation.

The operation of this part of our invention is in this wise: The channels formed between the dirt-chambers *c* being spiral gives to the smoke, sparks, and dirt, as they pass through, a rapid gyratory motion, and these ascend, whirling rapidly around the interior surface of the cap *k k*. Here, as in the case before described, the sparks, dirt, &c., which have not been arrested by the dirt-chambers *c* are caught at the several openings *o* and pressed into the spaces formed by the divisions *m* in the cap, as before described. Here they are removed from the influence of the external current, and fall by their own gravity into the receptacle formed by the space between *f* and *a*. Meantime the smoke and gases ascend to the highest point of the cap, and there come in contact with the pipe *p*, down which they descend in a spiral current, until they reach the lower edge or mouth, through which they escape into the air, as shown by the direction of the arrows. At the lower edge of the pipe *p* there is a flange, *p'*, which serves still further to catch any sparks or dirt which may yet have escaped all the apertures in the cover.

What we claim as of our own invention, and desire to secure by Letters Patent, is—

1. The arranging of a series of chambers and channels between two conically-shaped plates, the channels being so formed as to cause the products of combustion to impinge against that side of each of the dirt-chambers which has the openings and caps, and thereby force the sparks, dirt, &c., into them in the manner described herein.

2. The piece *p*, suspended in the central aperture at the top of the spark-arrester, arranged and operating in the manner and for the purpose substantially as hereinbefore described.

3. The double cover or top for the formation of a second series of dirt-passages, arranged and operating in the manner and for the purpose substantially as hereinbefore described.

JAMES RADLEY.
JOHN W. HUNTER.

Witnesses:
J. E. SHAW,
CHARLES D. FREEMAN.